United States Patent [19]
Bu et al.

[11] Patent Number: 6,025,953
[45] Date of Patent: Feb. 15, 2000

[54] ANNULAR SHUTTER MIRROR

[75] Inventors: Jong Uk Bu, Sungnam-Si; Keun Young Yang, Yongin-Si; Sung Woo Noh, Sungnam-Si, all of Rep. of Korea

[73] Assignee: LG Electronics, Inc., Seoul, Rep. of Korea

[21] Appl. No.: 08/887,221

[22] Filed: Jul. 2, 1997

[30] Foreign Application Priority Data

Jan. 17, 1997 [KR] Rep. of Korea ................. 97-1253

[51] Int. Cl.[7] ........................ G02B 26/08; G02B 5/08
[52] U.S. Cl. .................... 359/291; 359/224; 359/295; 359/847
[58] Field of Search .................... 359/291, 295, 359/224, 847

[56] References Cited

U.S. PATENT DOCUMENTS

| | | | |
|---|---|---|---|
| 3,343,448 | 9/1967 | Baird | 359/847 |
| 4,705,365 | 11/1987 | Wakita et al. | 359/224 |
| 4,741,609 | 5/1988 | Sallis | 359/847 |
| 5,109,300 | 4/1992 | Waddell | 359/847 |
| 5,737,302 | 4/1998 | Kasahara | 359/291 |

*Primary Examiner*—David Nelms
*Assistant Examiner*—Evelyn A. Lester

[57] ABSTRACT

An annular shutter mirror which can selectively shut off a part of light beams progressing toward a target in the progressing direction thereof. The annular shutter mirror utilizes a fixed reflection face to reflect an incident light beam at a constant angle in accordance with an incident angle of the incident light beam. Around the periphery of the fixed reflection face, at least one flexible reflection face is formed in a shape of annular band. This at least one flexible reflection face selectively reflects an incident light beam at an angle different from a reflective angle of the fixed reflection area in accordance with an application condition of an electrical field.

10 Claims, 9 Drawing Sheets

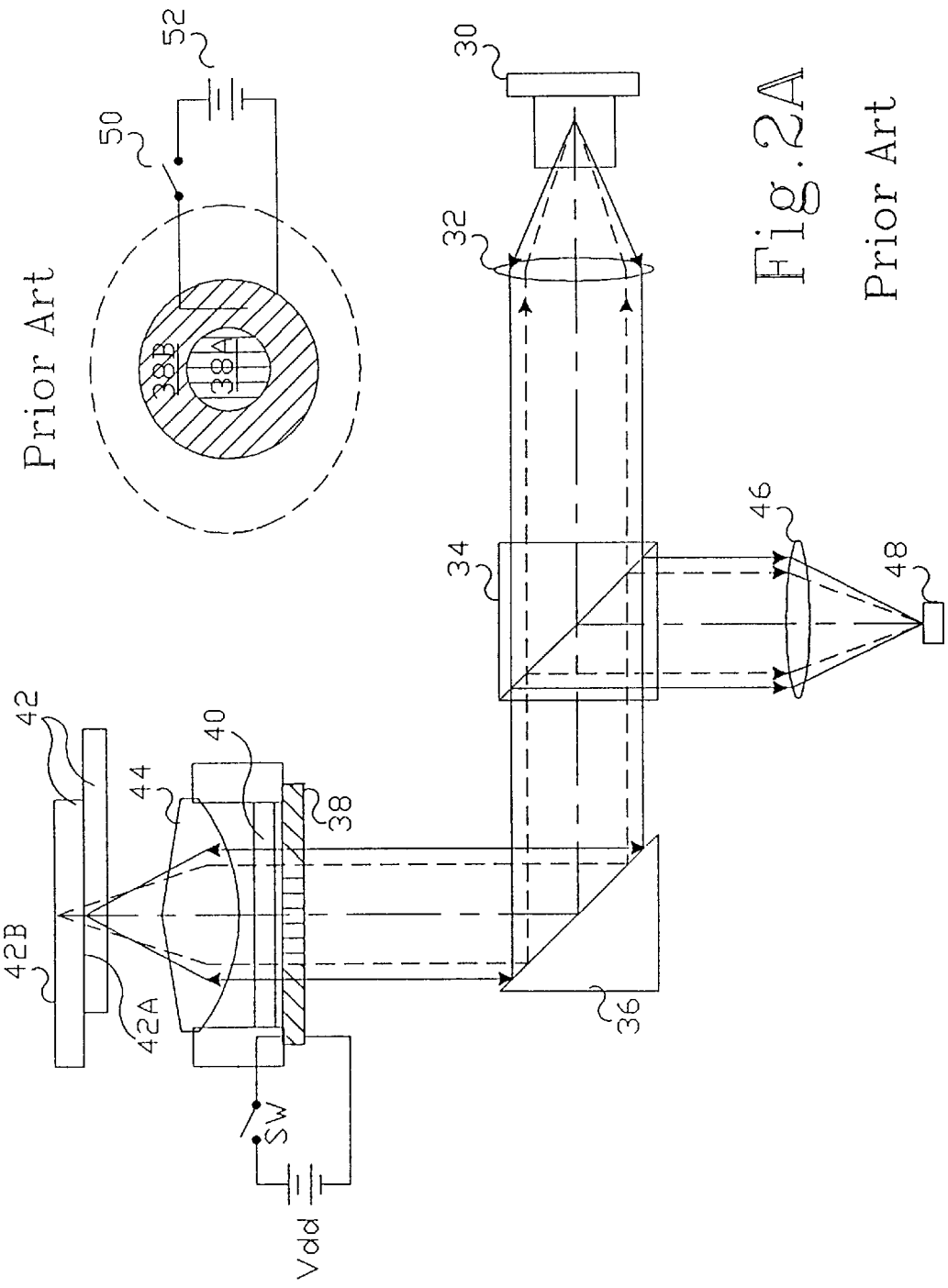

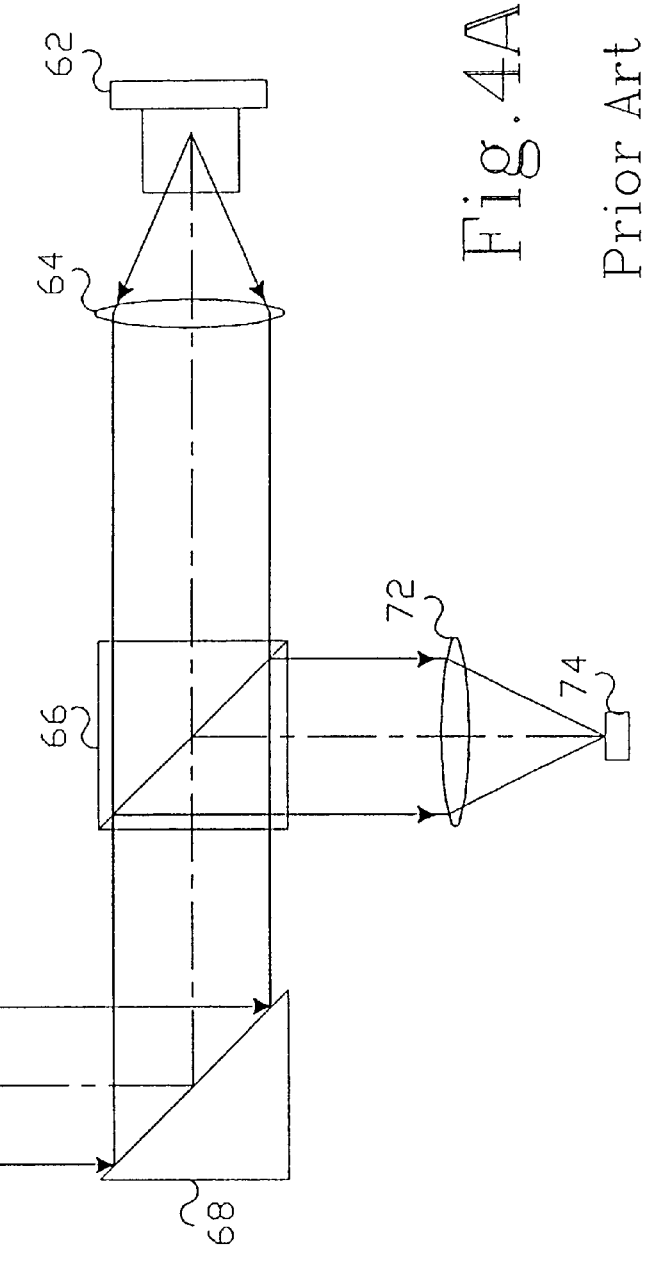
Fig.4A Prior Art
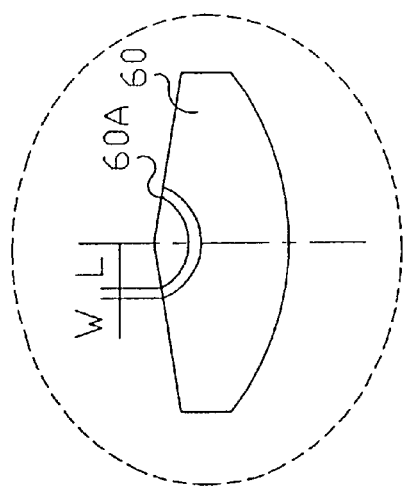
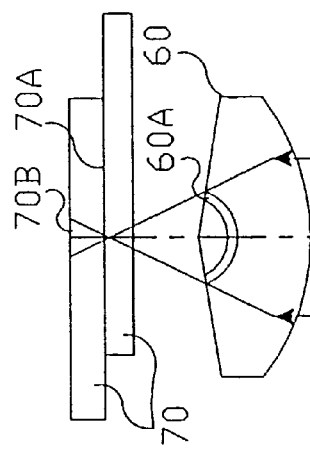
Fig.4B Prior Art

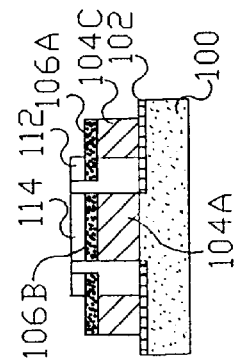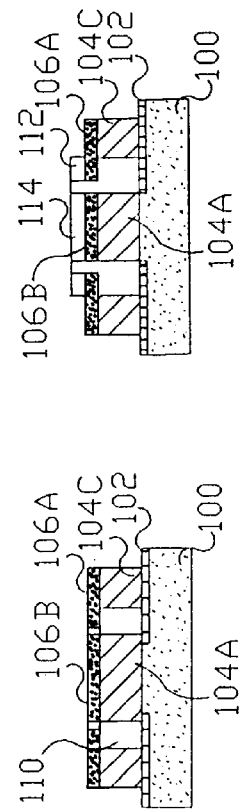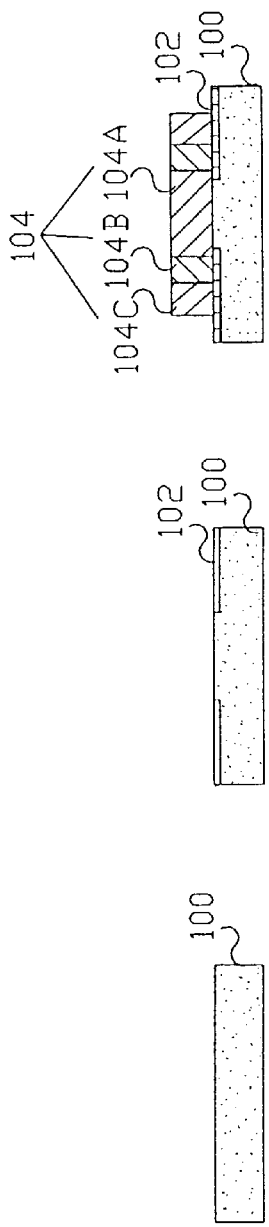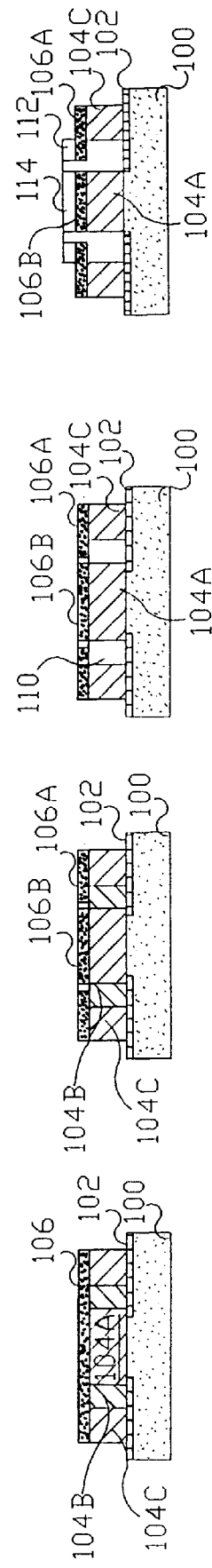

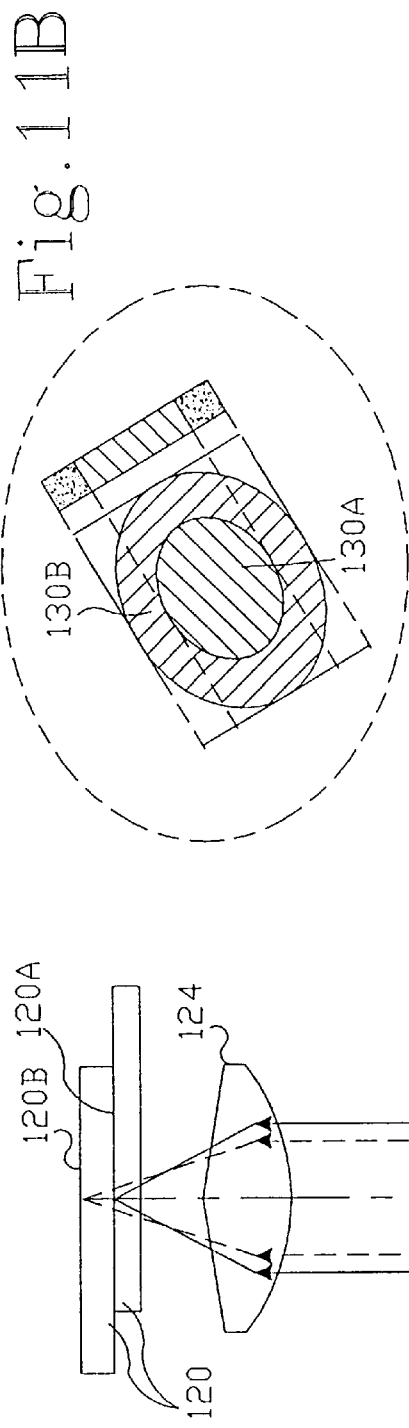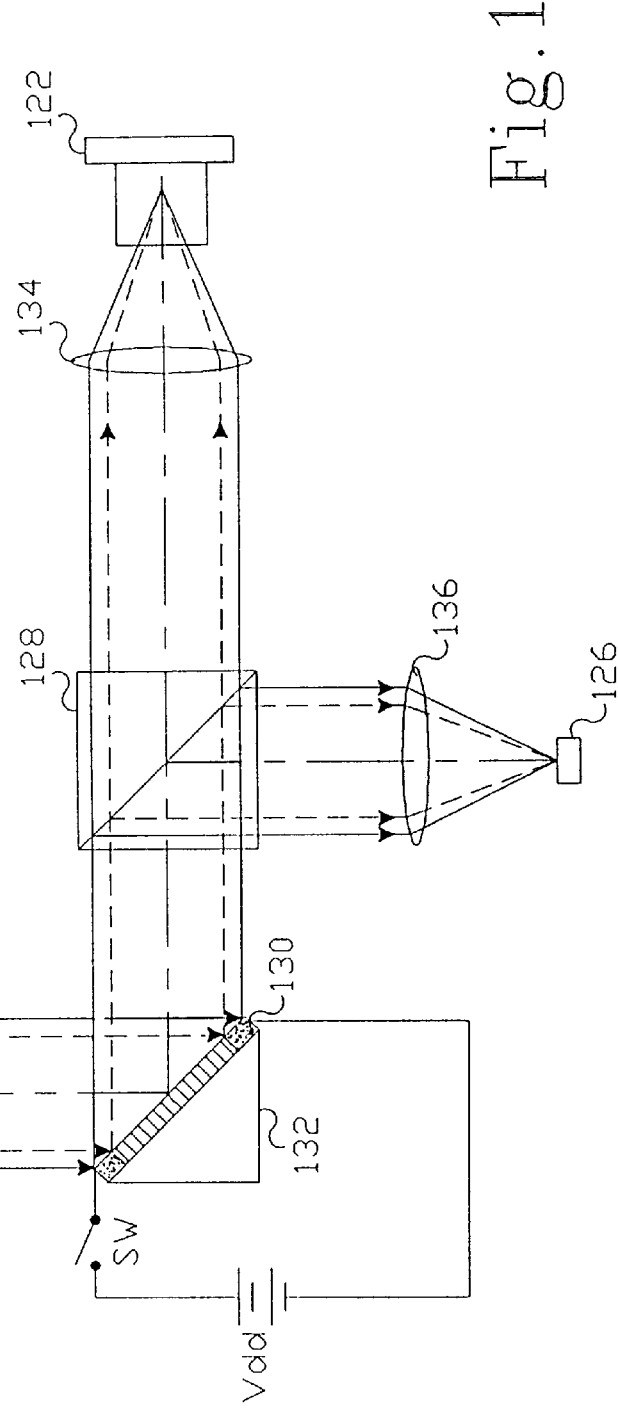
Fig. 11B
Fig. 11A

ANNULAR SHUTTER MIRROR

BACKGROUND OF THE INVENTION

1. Field of the Invention

This invention relates to an optical shutter for shielding a part of light beam selectively, and more particularly to an annular reflection mirror which can selectively reflect a part of light beam in the direction different from a progressing direction of the light beam and a manufacturing method thereof. Also, the present invention is directed to a different-type optical pickup device which can accurately access optical discs different in the depth extending from the surface thereof to the information recording face thereof by employing the annular shutter mirror.

2. Description of the Prior Art

In the recent recording medium, there has been required a capability of recording a higher capacity of information in accordance with the change into a large-scale of information quantity. Accordingly, an optical disc showing a remarkable increase of an occupation rate in the recording medium market also has been being developed such that it is possible to record a high capacity of information. As a result, in the optical disc market, there has appeared a digital versatile or video disc, hereinafter referred simply to as DVD, a recording capacity of which is about 6 to 7 times greater than that of the existing compact disc (CD) and the rewritable compact disc (CD-R). This DVD is not only higher than the CD and CD-R in a recording density, that is, in a track density, but also is shorter than those in a distance extending from the disc surface to the information recording face. In real, the distance from the disc surface to the information recording face in the DVD is 0.6 mm while that in the CD and CD-R is 1.2 mm.

As described above, different-type optical discs which have a different configuration are now commercially available in the optical disc market. Accordingly, an optical pickup device for accessing the optical disc also is required to have a capability of accessing all the different-type optical discs, that is, CD, CD-R and DVD and the like.

In order to satisfy the above requirement, there has been developed a holographic optical pickup device which comprises an objective lens system forming dual focus. This holographic optical pickup device allows a light beam, which is incident from a laser diode 10 via a partial reflection glass 12 to an objective lens 16, to be diffracted by means of a hologram lens 18, as shown in FIG. 1. The first-order diffracted light beam B1 allowing the objective lens 16 to maintain a numerical aperture of 0.4 and the zero-order diffracted light beam B0 allowing the objective lens 16 to maintain a numerical aperture of 0.6 are generated by the hologram lens 18. For the purpose of this, the hologram lens 18 is formed such that it has a concave surface of annular ring shape, and is combined such that the center of it is identical to that of the objective lens 16. Accordingly, the zero-order diffracted light beam B0 from the hologram lens 18 is focused onto the information recording face DF of the DVD in a shape of spot by the objective lens 16 while the first-order diffracted light beam B1 from the hologram lens 18 is focused onto the information recording face DS of the CD or CD-R in a shape of spot by the objective lens 16. Further, a multiple-division photo detector 22 converts into an electrical signal the zero-order diffracted light beam B0 which is reflected by the information recording face DF of the DVD and then is incident to it by way of the objective lens 16, the hologram lens 18, the collimator lens 14, the partial reflection glass 12 and the sensor lens 20 in turn and the first-order diffracted light beam B1 which is reflected by the information recording face DS of the CD or CD-R and then is incident to it by way of the objective lens 16, the hologram lens 18, the collimator lens 14, the partial reflection glass 12 and the sensor lens 20 in turn. As described above, the holographic optical apparatus could access the different-type optical discs by simultaneously forming the focus of light beam onto each of the information recording faces of the DVD and the CD/CD-R with the aid of the objective lens system having the hologram lens.

However, in the holographic optical pickup device, when a wavelength of the light beam generated at the laser diode changes according to a change of the external circumstance such as a temperature and the like, the diffraction angle of the diffracted light beam generated from the hologram lens changes. This change of diffraction angle in the diffracted light beam is caused to change the numerical aperture of objective lens, thereby generating an aberration. This allows a focus of light beam to be not formed on the information recording face of the DVD and the information recording face of the CD or CD-R. As a result, the holographic optical pickup device could not access the optical discs accurately when the temperature and the external circumstance, etc. changed. Also, the holographic optical pickup device had to experience a loss of light quantity depending on a diffraction efficiency of the hologram lens because it utilized only any one side of the zero-order diffracted light beam and the first-order diffracted light beam separated by the hologram lens in accordance with a type of optical disc. Due to the loss of light quantity, the holographic optical pickup device not only made a difficulty to do a signal process in the post-stage thereof, upon reading out information from the optical disc, but also it made a difficulty to irradiate a high power of light beam over a critical value required by an optical recording apparatus onto the optical disc. Further, the objective lens used for the holographic optical pickup device had nothing but to have a heavy weight because it must be formed in such a manner to be integral to the hologram lens. Owing to this heavy weight of the objective lens, the holographic optical pickup device could not access the optical disc at a high velocity.

In order to overcome such problems of the holographic optical pickup device, there has been suggested an optical pickup device employing a liquid crystal shutter and an optical pickup employing an annular shield. However, the former liquid crystal shutter type has a drawback in that it is necessary to use expensive polarizer and liquid crystal plate additionally. On the other hand, the latter annular shield type has a drawback in that a configuration thereof requires a high accuracy to made a mass production difficult. The above problems in these liquid Crystal shutter type and annular shield type of optical pickup device will be explained in detail with reference to FIG. 2 to FIG. 5 below.

Referring to FIG. 2A and 2B, there is shown an liquid crystal shutter type of optical pickup device which comprises an objective lens 44 for converging a light beam incident from a light source 30 via a collimator lens 32, a beam splitter 34, a orthogonal reflection glass 36, a liquid crystal plate 38 and a polarizer 40 in turn to it onto the first or second information recording face 42A or 42B of an optical disc 42. The collimator lens 32 converts a divergent light beam progressing from the light source 30 toward the beam splitter 34 into a parallel light beam. The beam splitter 34 allows a part, i.e., 50% of the light beam from the collimator lens to go toward the orthogonal reflection glass 36. Also, the beam splitter 34 allows a part, i.e., 50% of the light beam from the orthogonal reflection glass 36 to go toward the collimator lens, and simultaneously allows the remaining 50% of light beam to be reflected toward a sensor lens 46. The orthogonal reflection glass 36 makes a normal or perpendicular reflection of a light beam from the beam splitter 34 toward the liquid crystal plate 38, and simultaneously makes a normal or perpendicular reflection of a light beam from the liquid crystal plate 38 toward the beam splitter 34. The first information recording face 42A of the optical disc 42 is an information recording face of DVD, which is positioned on a depth of 0.6 mm from the surface of optical disc; while the second information recording face 42B of the optical disc 42 is an information recording face is an information recording face of CD or CD-R, which is positioned on a depth of 1.2 mm from the surface of optical disc. The sensor lens 46 converges the parallel light beam being incident from the beam splitter 34 into a multi-division photo detector 48. Subsequently, the multi-division photo detector 48 converts a light beam, which is reflected by the first or second information recording face 42A or 42B and then is incident thereto via the objective lens 44, the polarizer 40, the liquid crystal plate 38, the normal reflection glass 36, the beam splitter 34 and the sensor lens 46 in turn, into an electrical signal. This electrical signal generated at the multi-division photo detector 48 includes a servo signal for controlling a movement of the objective lens 44 in the up, down, left and right directions and an information signal recorded on the optical disc 42.

Further, the liquid crystal plate 38 is divided into a polarizing area 38A and an optional polarizing area 38B. The polarizing area 38A includes a liquid crystal layer, as not shown, in which liquid crystal particles are arranged in a constant direction, for providing a 90° rotation in a polarized direction of incident light beam. Otherwise, the optional polarizing area 38B selectively provides a 90° rotation in a polarized direction of incident light beam in accordance with an applied state of electrical field. For the purpose of this, the optional polarizing area 38B includes a liquid crystal layer, as not shown, in which liquid crystal particles are arranged in a constant direction, and a transparent electrode plate positioned on both sides of the liquid crystal layer. Also, the optional polarizing area 38B is connected with both a selection switch 50 and a voltage source 52 to form a circular circuit loop. In the case where the optical disc 42 is CD or CD-R, the selection switch 50 turns on such that a light beam going through the optional polarizing area 38B maintains the original polarized direction. On the other hand, in the case where the optical disc 42 is DVD, the selection switch 50 turns off such that a polarized direction of a light beam going through the optional polarizing area 38B is rotated by 90°. Subsequently, the polarizor 40 transmits a light beam having such a characteristic that a polarized direction of a light beam from the liquid crystal plate 38 is identical to its own polarizing direction while it shuts off a light beam having such a characteristic that that is different from its own polarizing direction. As a result, since a flux diameter of a light beam being incident to the objective lens 44 by means of the liquid crystal plate 38 and the polarizor 40 and a numerical aperture of the objective lens 44 is varied, the liquid crystal type of optical pickup device becomes capable of accessing all the DVD and CD/CD-R. The varying process of the flux diameter of light beam and the numerical aperture of objective lens will be described in more detail which reference to FIG. 3A and FIG. 3B below.

FIG. 3A shows a state of light beams going through the liquid crystal plate 38 and the polarizor 40 in the case where the voltage source 52 is not connected with the optional polarizing area 38B of the liquid crystal plate 38, that is to say, the selection switch 50 turns off. In this case, all of light beams going through the polarizing area 38A and the optional polarizing area 38B of the liquid crystal plate 38 are rotated by 90°such that they become identical to a polarized direction of the polarizor 40. All of light beams having the same polarizing characteristic as the polarizing direction of the polarizor 40 go through the polarizor 40, thereby increasing a numerical aperture of the objective lens 44. Accordingly, light beams of a smaller spot are formed on the first information recording face 42A positioned in a shallow depth from the disc surface, that is, on an information recording face of DVD by means of the objective lens 44, so that it becomes possible for the optical pickup device of liquid crystal type to access the DVD accurately. On the other hand, since light beams of much larger spot are irradiated onto the second information recording face 42B, that is, onto the an information recording face of CD or CD-R, it becomes impossible for the optical pickup device of liquid crystal shutter type to access the CD or CD-R.

FIG. 3B shows a state of light beams going through the liquid crystal plate 38 and the polarizor 40 in the case where the voltage source 52 is connected with the optional polarizing area 38B of the liquid crystal plate 38, that is to say, the selection switch 50 turns on. In this case, light beams going through the polarizing area 38A of the liquid crystal plate 38 are rotated by 90° such that they become identical to a polarizing direction of the polarizor 40; while light beams going through the optional polarizing area 38B of the liquid crystal plate 38 maintain the original polarized direction, thereby having a polarizing characteristic different from the polarizing direction of the polarizor 40. At this time, since only light beams from the polarizing area 38A of the liquid crystal plate 38 having the same polarizing characteristic as the polarizing direction of the polarizor 40 go through the polarizor 40, a numerical aperture of the objective lens 44 decreases. Accordingly, light beams of a smaller spot are formed on the second information recording face 42 positioned in a remote depth from the disc surface, that is, on an information recording face of CD or CD-R by means of the objective lens 44, so that it become possible to access the CD or CD-R accurately. On the other hand, since light beams of much larger spot are irradiated onto the first information recording face 42A, that is, onto the an information recording face of DVD, it becomes impossible for the optical pickup device of liquid crystal type to access the DVD. The optical pickup device of liquid crystal shutter type therefore can access all of the CD and DVD by controlling a size of the polarizing area 38A of the liquid crystal plate 38 and a numerical aperture of the objective lens 44 properly and by switching a voltage applied to the optional polarizing area 38B of the liquid crystal plate 38 in accordance with a kind of optical disc, that is, in accordance with whether an optical disc to be accessed is CD or DVD.

However, the liquid crystal shutter type of optical pickup device has drawbacks in that, since it is necessary to use expensive liquid crystal plate and polarizor additionally for controlling a flux diameter of light beam, it becomes to take a complicated configuration and also its manufacturing cost become expensive.

FIGS. 4A and 4B show an annular shield type of optical disc which can access all of the CD, CD-R and DVD with the aid of an objective lens 60 with a certain width of annular band or stripe 60A being defined. Referring to FIG. 4, the objective lens 60 converges a light beam, which is incident from a laser diode 62 via a collimator lens 64, a beam splitter 66 and a orthogonal reflection glass 68 in turn thereto, onto the first or second information recording face 70A or 70B of a optical disc 70. The first information recording face 70A is an information recording face of DVD positioned in a depth of 0.6 mm from the surface of the optical disc 70, and the second information recording face 70B is an information recording face of CD or CD-R positioned in a depth of 1.2 mm from the surface of the optical disc 70. a light beam irradiated onto the first or second information recording face 70A or 70B is reflected by the information recording face 70A or 70B, and then is incident to a multi-division photo detector 74 via the objective lens 60, the orthogonal reflection glass 68, the beam splitter 66 and a sensor lens 72 in turn. The multi-division photo detector 74 converts a light beam being incident from the sensor lens into an electrical signal to thereby generate a servo signal for indicating a state of up, down, left and right movement in the objective lens 60 and an information signal relative to information recorded on the optical disc 70.

Further, the objective lens 60 is an objective lens for DVD with a numerical aperture of 0.6, which converges such that a light beam from the orthogonal reflection glass 68 defines a smaller spot on the first information recording face 70A, that is, on the information recording face of DVD. Accordingly, in the first information recording face 70A, a light quantity is centered only on the spot having a small dimension of $\phi 1$ without a side strobe, as shown in FIG. 5A, so that it become possible to access the DVD accurately. Otherwise, in the second information recording face 70B of the optical disc 70, that is, in an information recording face of CD or CD-R, a light quantity is distributed from a central main strobe region having a $\phi 2$ dimension until peripheral side strobe regions $\phi s$. light fluxes irradiated onto the side strobe region $\phi s$ make a spot of light beam larger and also function as a noise, so that it becomes impossible to access the CD or CD-R accurately.

Furthermore, an annular band 60A defined in the objective lens 60 removes the side strobe regions generated at the second information recording face 70B, that is, an information recording face of CD or CD-R, whereby accurately accessing the DVD as well as the CD and CD-R. By this annular band, a light beam spot with a small dimension of $\phi 2$ is defined in the second information recording face 70B. In order to remove the side strobe regions $\phi s$ in the second information recording face 70B, the annular band 60A is defined in a partial region of the objective lens 60 generating the side strobe regions $\phi s$ in the second information recording face 70B, that is, in a region having a width of W from a position spaced by L from the center thereof.

However, in the annular shield type of optical pickup device, since the objective lens must be moved to the left or right direction thereof at the time of a control of tracking, the center of the objective lens and the annular band does not become identical to a light axis. This results in the side strobes being generated on the information recording face of CD or CD-R in accordance with a left or right movement of the objective lens. Moreover, in order to install the annular band in a region of objective lens generating the side strobe region in the information recording face of CD or CD-R accurately, a high accuracy is required in a configuration thereof. This made a difficulty in providing a mass production of the annular shutter type of optical pickup device.

SUMMARY OF THE INVENTION

Accordingly, it is an object of the present invention to provide an annular shutter mirror which can selectively shut off a part of light beam from a progressive direction thereof, and a manufacturing method of the annular shutter mirror.

It is other object of the present invention to provide an optical pickup device for a different-type optical disc which can accurately access optical discs different in a space between the surface and the information recording face thereof with the aid of an annular shutter mirror.

In order to obtain said objects of the invention, an annular shutter mirror according to one aspect of the present invention comprises fixed reflection means for reflecting an incident light beam at a constant angle in accordance with an incident angle of the incident light beam, and at least one flexible reflection means being defined in a shape of annular band, in parallel, around the periphery of the fixed reflection means for selectively reflecting the incident light beam at an angle different from a reflected angle in the fixed reflection means depending on an application condition of an electrical field.

Further, A manufacturing method of an annular shutter mirror according to other aspect of the present invention comprises the steps of providing a substrate, sequentially forming a first conductive layer, a supporting material layer and a second conductive layer on a surface of the substrate, patterning the second conductive layer into a central ellipse pattern and at least one annular pattern arranged in an outer side of the ellipse pattern, defining annular supporting walls in a lower portion of the edge of said at least one annular pattern by partially removing the supporting material layer positioned in a lower portion of said at least one annular pattern, and coating a reflective material on surfaces of the ellipse pattern and said at least one annular pattern.

Furthermore, an optical pickup apparatus for a different-type optical disc according to another aspect of the present invention comprises an optical system providing an optical path for guiding a light beam emitted from a light source toward the optical disc and for guiding a light beam reflected from the optical disc toward photo detector means, and light reflection means being positioned in the optical path for selectively shutting off a part of a light beam to be irradiated onto the optical disc in accordance with an application condition of an electrical field.

Moreover, an optical pickup apparatus for a different-type optical disc according to another aspect of the present invention comprises a light source for generating a light beam to be irradiated onto the optical disc, an objective lens for converging the light beam to be irradiated onto the optical disc, photo detector means for converting a light beam reflected by the optical disc into an electrical signal, and a shutter mirror for changing a progressing path of the light beam from the light source into one toward the objective lens and for selectively shutting off a part of the light beam progressing toward the objective lens in accordance with an application condition of an electrical field.

BRIEF DESCRIPTION OF THE DRAWINGS

These and other objects of the invention will be apparent from the following detailed description of the embodiments of the present invention with reference to the accompanying drawings, in which:

FIGS. 2A and 2B are schematic views of a configuration of an optical pickup device of liquid crystal shutter type for a different-type optical disc.

FIGS. 4A and 4B are schematic views of a configuration of an optical pickup device of annular shield type.

FIG. 9A to FIG. 9G are sectional views for explaining a manufacturing process of the annular shutter mirror according to an embodiment of the present invention.

FIGS. 11A and 11B are schematic views of a configuration of an optical pickup device for a different-type optical disc employing the annular shutter mirror shown in FIG. 6.

DETAILED DESCRIPTION OF THE PREFERRED EMBODIMENT

Figure 1:
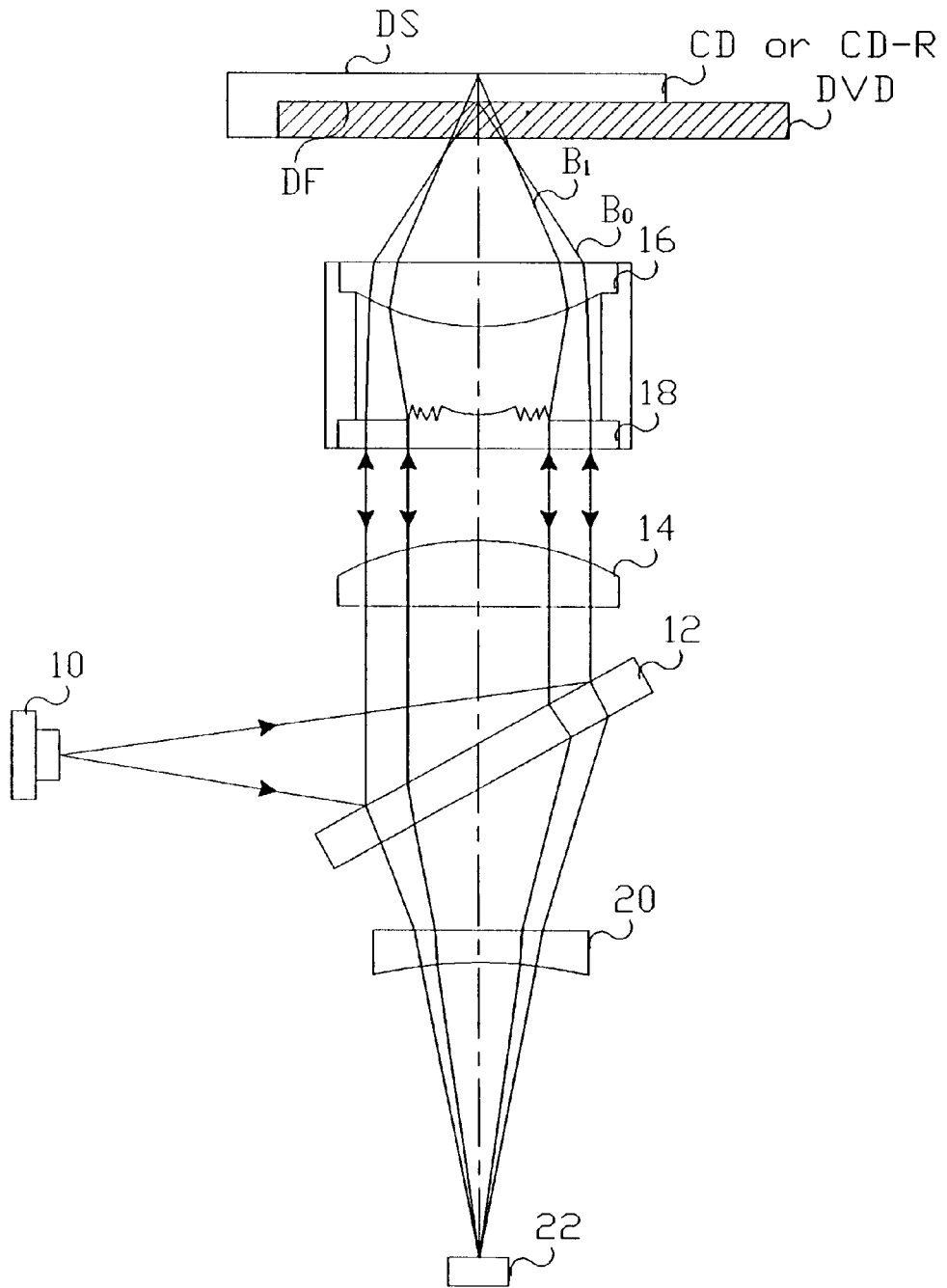
FIG. 1 is a schematic view of a configuration of a holographic optical pickup device for a different-type optical disc.
Figure 3A:
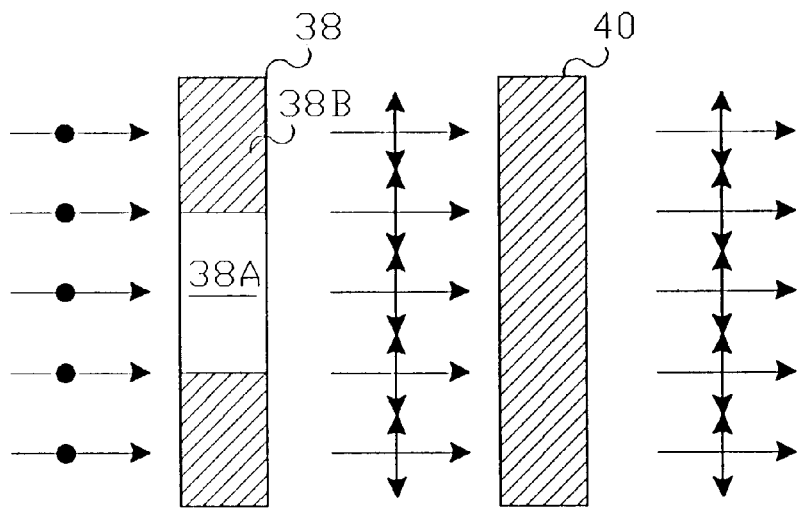
FIG. 3A and FIG. 3B are diagrams for explaining a state of light beams going through a liquid crystal plate and a polarizor, as shown in FIG. 2, respectively.
Figure 3B:
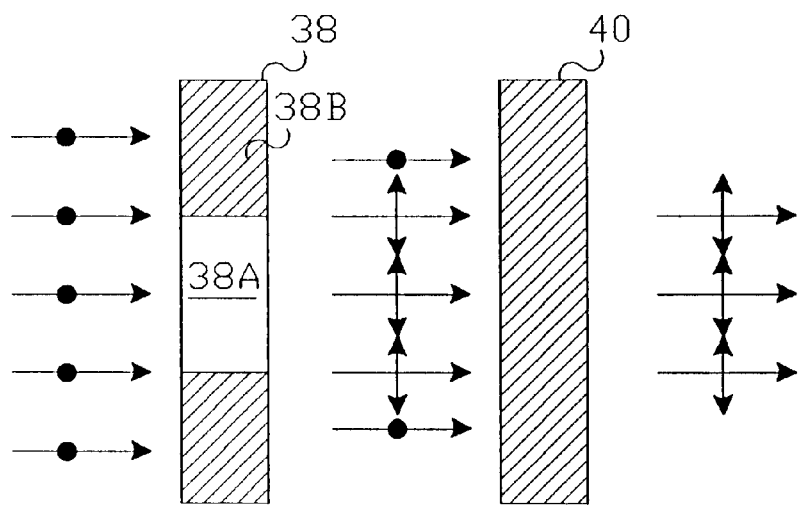
Figure 5A:
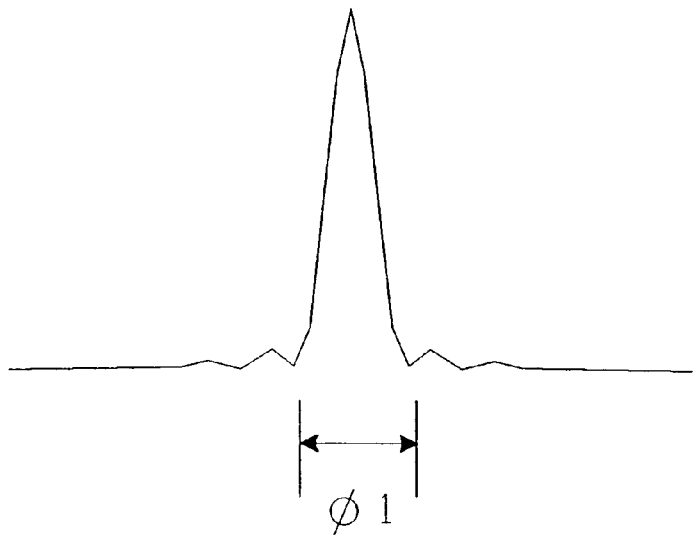
FIG. 5A to FIG. 5C are characteristic diagrams for explaining a distribution of a light beam irradiated onto an information recording face of the disc, respectively.
Figure 5B:
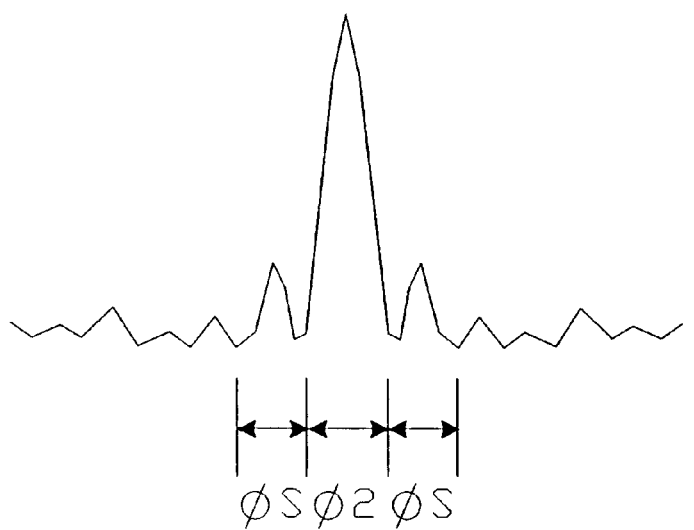
Figure 5C:
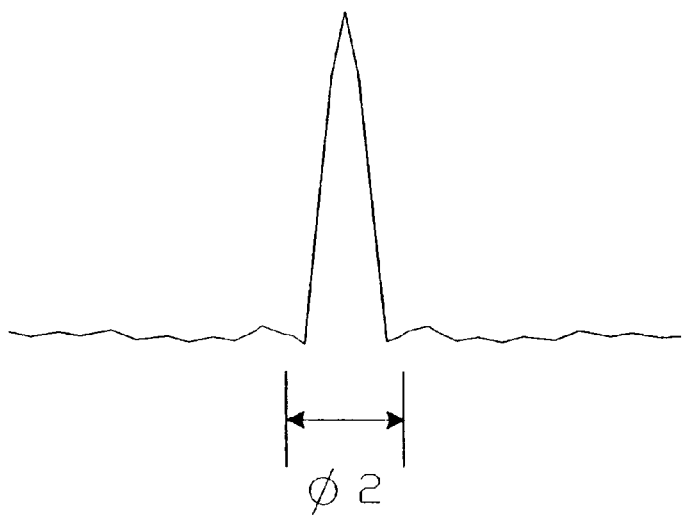
Figure 6:
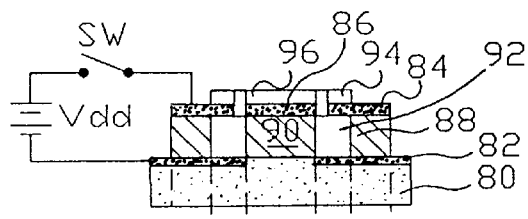
FIG. 6 is a sectional view of a configuration of an annular shutter mirror according to an embodiment of the present invention.
Figure 7:
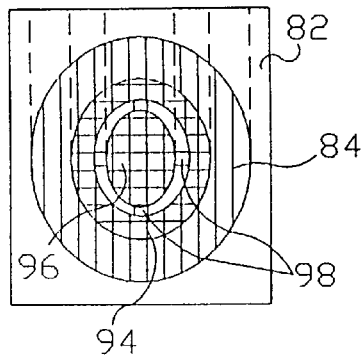
FIG. 7 is a plan view of a configuration of an annular shutter mirror according to an embodiment of the present invention.

FIG. 6 and FIG. 7 are a sectional view and a plan view of a structure of an annular shutter mirror according to a preferred embodiment of the present invention, respectively. Referring to FIG. 6 and FIG. 7, there is shown an annular shutter mirror which comprises a first electrode pattern 82 defined on the upper portion of a substrate 80, a second electrode pattern 84 opposite to the first electrode pattern 82, and a third electrode pattern 86 disposed on the center portion of the second electrode pattern 84. The first electrode pattern 82 is formed such that the surface of the substrate 80 is exposed in an ellipse shape at the center portion thereof. The second electrode pattern 84 is formed in an annular band shape to be opposed to the first electrode pattern 82 and is supported by a first supporting member 88. The third electrode pattern 86 is formed in an ellipse shape having the same area as the surface portion of the substrate 80 exposed by the first electrode pattern 82 and is disposed on the center portion of the second electrode pattern 84. Also, the third electrode pattern 86 is supported by a second supporting member 90. The first supporting member 88 makes a shape of an annular sidewall to support the outer edge of the second electrode pattern 84. The second supporting member 90 is formed in a shape of ellipse post an area of which is equal to that of the third electrode pattern 86 and the exposed substrate 80. Accordingly, between the first electrode pattern 82 and the second electrode pattern 84, an annular cavity 92 is defined by the first and second supporting members 88 and 90. This cavity provides such a space that the second electrode pattern 84 can be deformed into an arc shape toward the down side. The second electrode pattern 84 is formed from a flexible conductive material such that it is curved into the acting direction of electrical field by an electrical field.

Moreover, the annular shutter mirror further comprises a first reflective material layer pattern 94 defined on the surface of a part of the second electrode pattern 84 and a second reflective material layer 96 defined on the entire surface of the third electrode pattern 86. The first reflective material layer pattern 94 is formed on the inner surface of the second electrode pattern 84 in a shape of annular band such that the outer edge of the second electrode pattern 84 is exposed. In addition, in the annular gap between the first reflective material layer 94 and the second reflective material layer 96, four linkers 98 are arranged to correspond in the vertical and horizontal axes. These linkers 98 connect the second electrode pattern 84 with the third electrode pattern 86, and thus allows the first and second reflective material layers 94 and 96 to be undeformed. Further, between the first electrode pattern 82 and the second electrode pattern 84, a selection switch SW and a voltage source Vdd is connected in serial. The selection switch SW selectively turn on or off by an operation of a user to apply a voltage from the voltage source Vdd between the first electrode pattern 82 and the second electrode pattern 84. In accordance with a switching state of this selection switch SW, the second electrode pattern 84 is selectively deformed along with the first reflective material layer pattern 94 to selectively separate and shut off a part of light beams in the edge in light beams progressing toward a target. This will be described in detail in accordance with the switching state of the selection switch below.

Figure 8A:
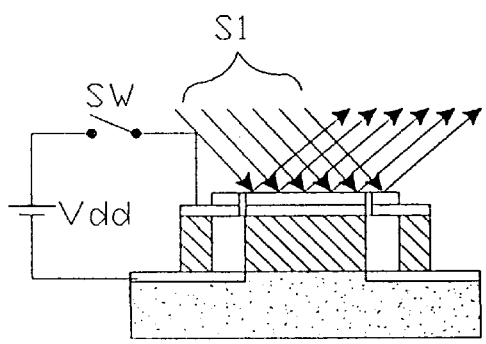
FIGS. 8A, 8B, and 8C are diagrams for explaining an operation state of the annular shutter mirror according to an application of voltage, respectively.
Figure 8B:
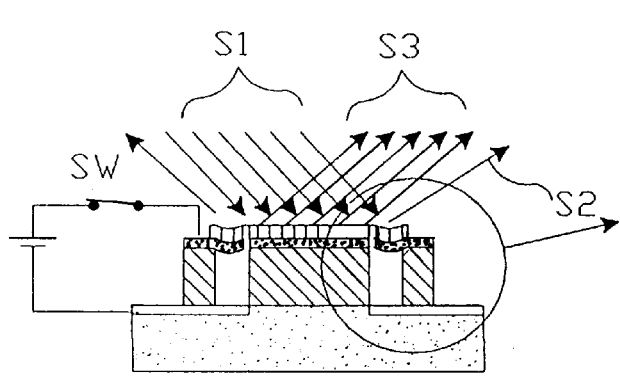
Figure 8C:
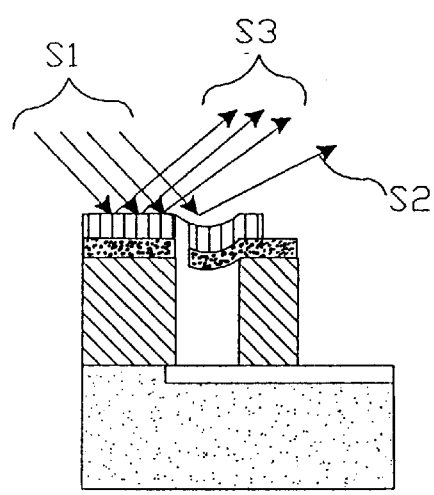

Firstly, in the case where the selection switch SW turns off by a user, as shown in FIG. 8A, an electrical field is not applied between the first electrode pattern 82 and the second electrode pattern 84, thereby allowing the second electrode pattern 84 to keep the same plane as the third electrode pattern 86. Accordingly, all of the light beams S1 incident to the first and second reflective material layers 94 and 96 at an inclined angle of 45° are reflected in the perpendicular direction thereof and then progress toward the target. Otherwise, in the case where the selection switch SW turns on by a user, as shown in FIGS. 8B and 8C, an electrical field is generated between the first electrode pattern 82 and the second electrode pattern 84 by a voltage from the voltage source Vdd. Accordingly, the inner side of the second electrode pattern 84 is curved in an arc shape and toward the down side by the electrical field along with the first reflective material layer pattern 94, thereby reflecting light beams S2 of the edge in the light beams S1 incident thereto at the inclined angle of 45°, that is, light beams incident to the first reflective material layer pattern 94 at an angle larger than or smaller than 90° while reflecting the remaining light beams of the center portion, that is, light beams incident to the second reflective material layer pattern 96 at a right angle. As a result, light beams in the edge in light beams progressing toward the target are separated and shut off by the first reflective material layer pattern 94.

FIG. 9A to FIG. 9G are sectional views for explaining a manufacturing process of an annular shutter mirror according to an embodiment of the present invention in each step thereof, respectively, and FIG. 10A to FIG. 10G are plan views for explaining a manufacturing process of an annular shutter mirror according to an embodiment of the present invention in each step thereof, respectively. A manufacturing process of an annular shutter mirror according to an embodiment of the present invention will be described in detail with reference to these FIG. 9A to FIG. 9G and FIG. 10A to FIG. 10G.

Figure 10C:
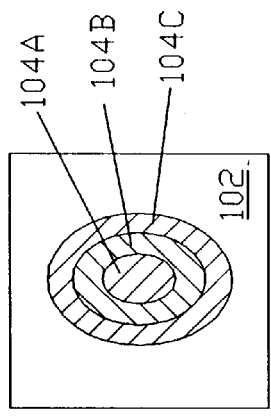
FIG. 10A to FIG. 10G are sectional views for explaining a manufacturing process of the annular shutter mirror according to an embodiment of the present invention.
Figure 10B:
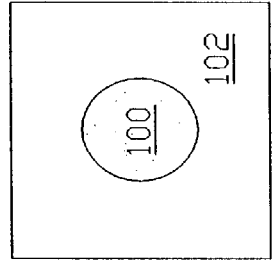
Figure 10A:
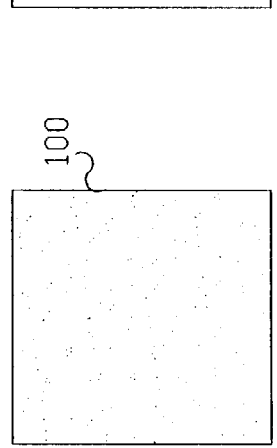
Figure 10G:
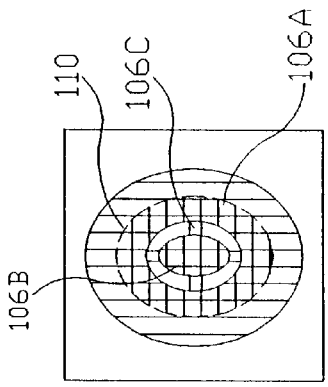

Referring to FIG. 9A and FIG. 10A, there is provided a substrate 100 with a rectangular plane. On the surface of this substrate 100, a first electrode pattern 102 exposing a center portion of the surface of the substrate 100 in an ellipse shape is formed, as shown in FIG. 9B and FIG. 10B. This first electrode pattern 102 is formed by depositing a conductive material layer on the surface of the substrate 100 and then removing the center portion of the deposited conductive material layer into the ellipse shape by means of the photolithography.

Subsequently, a supporting material layer 104 is formed on the surface of the exposed substrate 100 and an annular area having a constant width from the inner corner of the first electrode pattern 102 adjacent thereto, as shown in FIG. 9C and FIG. 10C. This supporting material layer 104 consists of the first to third supporting material layer patterns 104A to 104C. The first supporting material layer pattern 104A is defined in such a manner that it overlaps with the upper portion of the ellipse-shape substrate 100 exposed by the first electrode pattern 102. The second supporting material layer pattern 104B is defined in such a manner that it makes an annular ellipse band with a constant width from the corner of the first supporting material layer pattern 104A. The third supporting material layer pattern 104C is defined in such a manner that it makes an annular ellipse band with a constant width from the outer corner of the second supporting material layer pattern 104B. Also, the third supporting material layer pattern 104C is formed such that its width is much smaller than that of the second supporting material layer 104B. On the other hand, the second supporting material layer pattern 104B consists of a material different from the first and third supporting material patterns 104A and 104C in the etching selection ration. The first and third supporting material layer patterns 104A and 104C is formed by defining the first supporting material layer on the first electrode pattern 1102 and the surface of the exposed substrate 100 by means of the deposition and then by partially removing the first supporting material layer by means of the photolithography. At this time, the first and third supporting material layer patterns 104A and 104C becomes to expose the edge of the first electrode pattern 102 and the center portion of the annular ellipse band. Further, the second supporting material layer pattern 104B is formed by embedding the second supporting material different from the first supporting material in an etching selection ratio between the first supporting material layer pattern 104A and the third supporting material layer pattern 104C and then by evenly smoothing the embedded second supporting material. Next, on the supporting material layer 104, the second conductive material layer 106 is deposited by means of the so-called evaporation.

Figures 10E, 10F:
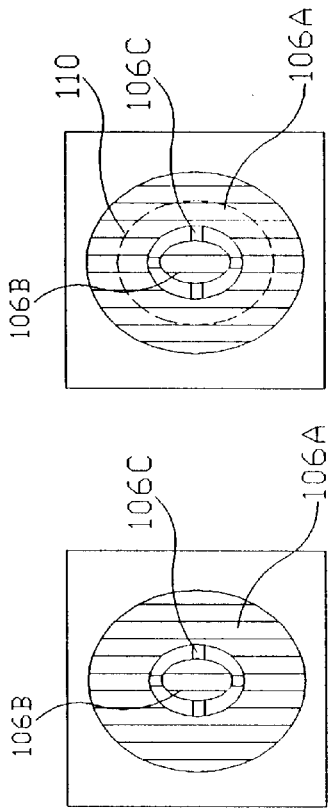
Figure 10D:
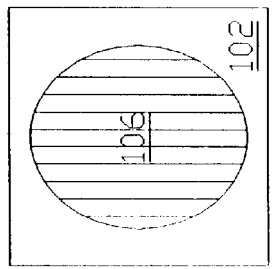

In FIG. 9E and FIG. 10E, there are provided a second electrode pattern 106A of annular bane shape, a third electrode pattern 106B of ellipse shape positioned in the center portion of the second electrode pattern 106A, and linkers 106C arranged in opposition to one another in the vertical and horizontal axes to connect the second electrode pattern 106A with the third electrode pattern 106B. Between the second electrode pattern 106A and the third electrode pattern 106B, an annular gap with a width corresponding to the length of linkers 106C is formed to exposed the second supporting material layer pattern 104B partially. These second and third electrode patterns 106A and 106B and linkers 106C are formed by removing the second conductive material layer 106 partially by means of an etching process employing the photolithography. Referring now to FIG. 9F and FIG. 10F, a cavity 110 is provided between the third supporting material layer pattern 104C positioned in the lower portion of the outer edge of the second electrode pattern 106A and the first supporting material layer pattern 104A positioned in the lower portion of the third electrode pattern 106B. This cavity 110 is formed by removing the second supporting material pattern 104B positioned in the inner lower portion of the second electrode pattern 106A by means of the wet etching. In this wet etching process, a etchant, i.e., etching liquid goes by way of the annular gap between the second electrode pattern 106A and the third electrode pattern 106B and selectively removes only the second supporting material layer pattern 104B to thereby form the cavity 110.

Finally, on the surfaces of the second and third electrode patterns 106A and 106B, first and second reflective material layer patterns 112 and 114 are formed, respectively. The first reflective material layer pattern 112 is defined in an annular shape to expose the outer edge of the second electrode pattern 106A. The second reflective material layer pattern 114 is defined in an ellipse shape to occupy the entire surface of the third electrode pattern 106B. These first and second reflective material layer patterns 112 and 114 is formed by depositing reflective material layers on the surfaces of the first and third electrode patterns 106A and 106B and of the linkers 106C.

Referring now to FIGS. 11A and 11B, there is shown an optical pickup device for a different-type optical disc according to an embodiment of the present invention which comprises a light source 122 for generating a light beam to be irradiated onto an optical disc 120, an objective lens 124 for focusing the light beam from the light source 122 on the first and second information recording faces 120A and 120B of the optical disc 120, and a multi-division photo detector 126 for converting the light beam reflected by the optical disc 120 into an electrical signal. The first information recording face 120A of the optical disc 120 is a DVD information recording face positioned in the depth of 0.6 mm from the surface thereof, and the second information recording face 120B of the optical disc 120 is a CD or CD-R information recording face positioned in the depth of 1.2 mm from the surface thereof. Also, the objective lens 124 converges the light beam onto either the first information recording face 120A or the second information recording face 120B in a shape of spot in accordance with a flux diameter of the light beam progressing from the light source 122 toward the optical disc 120. The multi-division optical detector 126 converts the light beam reflected by the first or second information recording face 120A or 120B of the optical disc 120 into an electrical signal to thereby generating a servo signal indicating a movement state of the objective lens 124 in the up, down, left or right direction and an information signal about an information recorded on the information recording face 120A or 120B of the optical disc 120.

Moreover, said optical pickup device for a different-type optical disc further comprises a beam splitter 128 disposed among the light source 122, the objective lens and the photo detector 126, an annular shutter mirror 130 positioned between the objective lens 124 and the beam splitter 128, and a selection switch SW and a voltage source Vdd connected to the annular shutter mirror 133 in a shape of circular circuit loop. The beam splitter 128 goes through a light beam of 50% in the light beam from the light source 122 toward the annular shutter mirror 130. Also, the beam splitter 128 passes through a light beam of 50% in the reflected light beam from the annular shutter mirror 130 toward the light source 122 while it reflects the remaining light beam of 50% toward the multi-division photo detector 126. The shutter mirror 130 is arranged at an inclined angle of 45° by an orthogonal or perpendicular prism 132, and reflects the light beam from the beam splitter 128 to the objective lens 124 at a right angle and also reflects the reflected light beam from the objective lens 124 to the beam splitter 128 at a right angle. Further, the annular shutter mirror 130 varies a flux diameter of the light beam progressing toward the objective lens 124 in accordance with a switching state of the selection switch SW. In order to obtain this, the annular shutter mirror 130 includes a fixed reflection area 130A in an ellipse shape for unconditionally reflecting an incident light beam at a right angle independently of the switching state of the selection switch SW, and a flexible reflection area 130B formed in an annular shape around the periphery of the fixed reflection area 130B to reflect an incident light beam at a right angle, or at an angle smaller or larger than the right angle depending on a switch state of the selection switch SW. This flexible reflection area 130B is connected to make the circular circuit loop along with the selection switch SW and the voltage source Vdd, thereby being kept in a horizon or curved in a shape of arc in a switching state of the selection switch SW. A process in which a flux diameter of the light beam reflected by the annular shutter mirror 130 in accordance with a switching state of the selection switch SW varies, will be described in more detail below.

Firstly, in the case where the selection switch SW turns off by a user, as shown in FIG. 8A, the flexible reflection area 130B is kept in a horizontal direction in similar to the fixed reflection area 130A. Accordingly, all of light beam's incident to the fixed reflection area 130A and the flexible reflection area 130B is reflected at a right angle to progress toward the objective lens 124, thereby maintaining a numerical aperture of the objective lens 124 at a relatively large value of 0.6. Further, light beams going by way of the objective lens 124 is focused on the first information recording face 120A of the optical disc 120, that is, on an information recording face of DVD in a shape of small size spot by means of the objective lens 124 to thereby access the DVD accurately.

On the other hand, in the case where the selection switch SW turns on by a user, as shown in FIG. 8B, the flexible reflection area 130B is curved into a shape of are in the down direction by a voltage of the voltage source Vdd to thereby define a reflective face in the arc shape different from the fixed reflection area 130A. Also, the flexible reflection area 130B reflects incident light beams S2 at an angle larger or smaller than 90° in dissimilar to the fixed reflection area 130A, thereby allowing them not to be incident to the objective lens. Accordingly, since only light beams S3 reflected by the fixed reflection area 130A are incident to the objective lens 124, a numerical aperture of the objective lens 124 becomes to maintain at a relatively small value of 0.4. As a result, light beams S3 going by way of the objective lens 124 make small size of spots on the second information recording face 120B of the optical disc 120, that is, on an information recording face of CD or CD-R to thereby access the CD and CD-R accurately.

Furthermore, said optical pickup device for a different-type optical disc includes a collimator lens 134 arranged between the light source 122 and the beam splitter 128, and a sensor lens 136 arranged between the multi-division optical detector 126 and the beam splitter 128. The collimator lens 134 converts a diverged light beam progressing from the light source 122 toward the beam splitter 128 into a parallel light beam. The sensor lens 136 converges a parallel light beam progressing from the beam splitter 128 toward the multi-division photo detector 126 onto the surface of the multi-division photo detector 126.

As described above, an annular shutter mirror according the embodiment of the present invention allows a part of the reflective face to be selectively deform in accordance with an application condition of the electrical field to thereby separate and shut off a part of the light beam progressing toward the target so that it can control the flux diameter of the light beam. Also, since an annular shutter mirror of the present invention is manufactured by a general semiconductor manufacturing process such as evaporation, etching and the like, it can not only be manufactured with a higher accuracy, but also the mass production thereof becomes feasible.

Further, an optical pickup device for a different-type optical disc according the embodiment of the present invention varies a path of light beam and a flux diameter of light beam depending on a type of optical disc by utilizing an annular shutter mirror instead of the reflective glass changing a path of light beam as an optical shutter for varying the flux diameter of light beam, so that it can not only access different types of optical discs accurately, but also the simplified configuration thereof is possible. Also, since an optical pickup device for a different-type optical disc according to the embodiment of the present invention employs the annular shutter mirror having a higher accuracy and being capable of the mass production, it becomes possible to reduce a manufacturing cost thereof. Moreover, in the optical pickup device for a different-type optical disc according to the present invention, an annular shutter mirror is installed in such a manner to be separated from the objective lens, so that it becomes possible to obtain a very high access speed of the optical disc.

Although the present invention has been explained by the embodiments shown in the drawing hereinbefore, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their legal equivalents.

What is claimed is:

1. An annular shutter mirror, comprising;
    fixed reflection means for reflecting an incident light beam at a constant angle in accordance with an incident angle of said incident light beam; and
    at least one flexible reflection means being defined in a shape of an annular band around the periphery of said fixed reflection means for selectively reflecting said incident light beam at an angle different from a reflected angle off said fixed reflection means depending on an application condition of an electrical field.

2. An annular shutter mirror as set forth in claim 1, wherein said reflection means has a reflecting surface and each of said at least one flexible reflection means comprises
    a fixed electrode pattern formed on a substrate surface;
    a flexible electrode pattern in said shape of said annular band being positioned above said fixed electrode pattern, an edge portion of said flexible electrode pattern being parallel to said reflecting surface of said fixed reflection means;
    a supporting member on said fixed electrode pattern for supporting the edge portion of said flexible electrode pattern; and
    a reflective material pattern formed on an upper portion of said flexible electrode pattern.

3. An annular shutter mirror as set forth in claim 2, further comprising a connecting member for preventing a movement of said reflective material patterns by connecting flexible electrode patterns with said fixed reflection means by a part thereof.

4. An optical pickup apparatus for accessing an optical disc, the apparatus comprising:
    an optical system providing an optical path for guiding a light beam emitted from a light source toward said optical disc and for guiding a light beam reflected from said optical disc toward a photo detector device; and a light reflection device, positioned in said optical path, to selectively shut off a part of said light beam impinging on said optical disc in accordance with an application condition of an electrical field, the light reflection device including a fixed reflection assembly to reflect said impinging light beam at a constant angle in accordance with an incident angle of said impinging light beam, and at least one flexible reflector, defined in a shape of an annulus, around the periphery of said fixed reflection assembly for selectively reflecting said impinging light beam at an angle different from a reflected angle produced by said fixed reflection assembly depending on an application condition of an electrical field.

5. An annular shutter mirror as set forth in claim 2, wherein said reflective material pattern on said flexible electrode pattern is coplanar with said reflecting surface of said reflection means in an absence of said electric field.

6. An annular shutter mirror comprising:

a first support structure having a reflective surface;

an annular second support structure located around a periphery of said first support structure;

an annular flexible structure partially supported by said annular second support structure, said annular flexible structure being reflective and electrically conductive so as to be deformable in response to an electric field.

7. The mirror of claim 6, wherein said annular support structure includes:

a substrate;

a planar fixed electrode on said substrate; and a supporting member on said planar fixed electrode, said supporting member being arranged to support an annular edge region of said annular flexible structure.

8. The mirror of claim 6, wherein said annular flexible structure includes:

an electrode, an annular outer edge portion of which is located on said annular second support structure; and a reflective layer on said electrode.

9. The mirror of claim 8, wherein said first support structure includes a supporting member, and said reflective surface of said first support structure is a layer of reflective material on said support structure; and wherein said layer of reflective material in said first support structure is parallel to said reflective layer in said annular flexible structure in an absence of said electrical field.

10. The mirror of claim 9, wherein said layer of reflective material in said first support structure is coplanar with said reflective layer in said annular flexible structure in an absence of said electrical field.

* * * * *